April 11, 1961 A. W. BALDWIN 2,978,905

CODED MESSAGE ERROR INDICATING DEVICE

Filed July 15, 1957

INVENTOR
ALAN W. BALDWIN

BY Richard C. Reed
ATTORNEYS

United States Patent Office 2,978,905
Patented Apr. 11, 1961

2,978,905

CODED MESSAGE ERROR INDICATING DEVICE

Alan W. Baldwin, Oxon Hill, Md.
(4406 Panorama Drive SE., Washington 21, D.C.)

Filed July 15, 1957, Ser. No. 672,100
2 Claims. (Cl. 73—156)
(Granted under Title 35, U.S. Code (1952), sec. 266)

The invention described herein may be manufactured and used by or for the Government of the United States of America for Governmental purposes without the payment of any royalties thereon or therefor.

The present invention relates to a device for sending coded messages and more particularly to a means for quickly and accurately checking the coded messages for correctness of information displayed.

Several present day devices require transfer of coded messages, data, etc., from one machine to another. For instance, figures obtained by computers, according to data fed into the computer, figures from reference tables, and digital information obtained from various sources are set into a digital information machine for relaying a signal, code or message to various places. The task of setting the digital information or code into a machine is subject to human error and requires considerable time to insure accuracy. This delay in time and accuracy may have considerable bearing on the outcome of a desired result which proves to result in failure or success of a project.

The device of the present invention relates a printed and punched code message to the sending unit in such a manner that the coded message is in visual proximity with the setting of the sending code arrangement. In the particular arrangement, the setting of sending dial is aligned with the coded tape message and the relationship between the setting of the dials and the tape is such that if the proper sending dial setting does not correspond to the punched code tape reference, it will be readily observed by visual inspection of the tape. Such a relationship greatly enhances accurate and rapid transfer of printed data into a machine and provides for an accurate visual comparison of the input settings.

It is therefore an object of the present invention to provide a device for quickly and accurately checking information set into a digital information sending device.

Another object is to provide a device by which human error can be minimized in sending coded messages.

Still another object is to provide an inexpensive device for accurately and rapidly transferring printed data into a machine.

Yet another object is to provide a device for visually checking input settings for a coding machine.

The nature of this invention as well as other objects and advantages thereof will be readily apparent from consideration of the following specification relating to the annexed drawings in which.

The present invention relates to a device for sending coded messages and to as visual means for rapidly and accurately checking the code. The device comprises a series of dial cylinders having digits from zero to nine thereon which drive repeater cylinders adjacent thereto. The repeater cylinders are identical in size to the dial cylinders and colored red with grey dots thereon. The coded tape (grey in color) is positioned over the repeater cylinders and when the proper digit appears on the dial cylinder the grey dots will appear through the punched hole on the tape producing a homogeneous tape field color. However, if the dial cylinder has the incorrect digit setting the red portion of the repeater cylinder will appear through the punched hole and the operator will know that the dial cylinder is set at the wrong coded digit.

Figure 2:
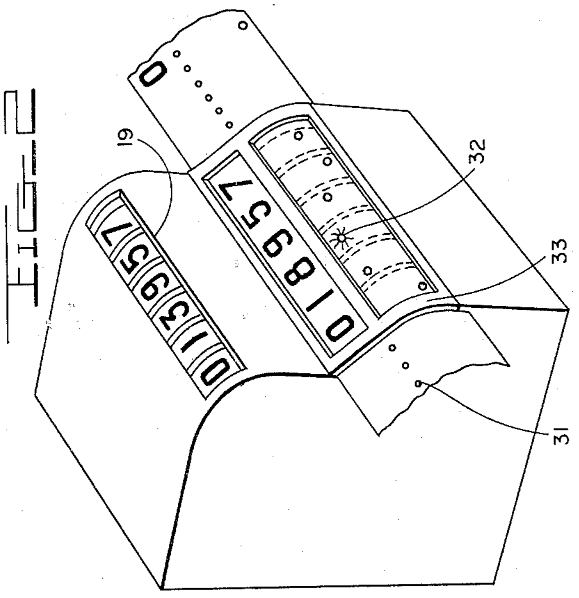
Fig. 2 is a view similar to Fig. 1 which illustrates a coded tape and setting of the device illustrating an error.

Referring to the drawings, there is shown by illustration a device according to the present invention which includes a housing 10 within which is located six separate dial cylinders 11–16 that have digits from zero to nine equally spaced thereon, one digit on each cylinder can be seen through a window 19 in the housing as shown in Fig. 2. Each cylinder is positioned side by side and rotatable about a shaft 17 and have teeth 18 along one edge thereof which drive dimensionally equal repeater cylinders 21–26 at a ratio of one to one through suitable drive wheels 27. Cylinders 21–26 are positioned side by side in alignment with cylinders 11–16 and rotatable about a shaft 28 which rotates through an arc equal to the rotation of the corresponding dial cylinder.

The repeater cylinders are colored red or any color suitable to contrast with the tape color and have properly spaced dots 29 thereon, preferably of the same color as the tape such as grey. The grey dots are spaced in columns such that by advancing the dial cylinder for each digit, a dot on the repeater cylinder will align with a hole in the coding tape which corresponds to the digit shown on the dial cylinder.

Figure 3:
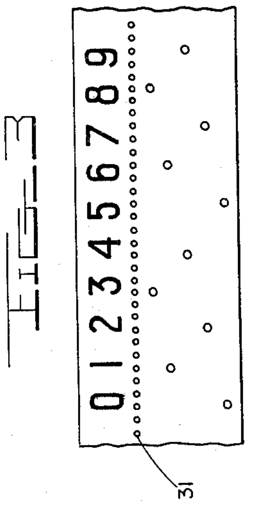
Fig. 3 is a view of the tape illustrating the printed digits and the relative corresponding punched hole for each printed digit.

The device shown makes use of a standard eight-channel tape as a data source and is provided with indexing holes 31 for mechanically driving the tape to successive coding position by a sprocket (not shown) or for driving a "footage counter" by movement of the tape. The upper three channels of the tape are used for printed digits equally spaced thereon according to the width of the dial cylinders 11–16, and the lower five-channels are used for a punched code according to the digits appearing on the tape as illustrated in Fig. 3. As shown, each of the digits are spaced three columns apart wherein the first column of the five lower channels is provided for punched digits 0 to 4 inclusive, an adjacent column for punched digits 5 to 9 inclusive, and the third column is left blank to provide a spacing between the dial cylinders. In this manner the punch code for digit 0 appears in the bottom channel of column one, digit 1 appears in channel four of the same column, whereas digit 2 appears in channel two, digit 3 appears in channel five and digit 4 appears in channel three of the same column. In a similar manner, the punch code for digit 5 appears in the bottom channel of the second column, digit 6 appears in channel four of the second column and digits 7, 8 and 9, follow in like order for the second column as set forth above for digits 2, 3 and 4. In setting up a digital code, the holes would be punched in the proper channel and column according to the desired digit.

The repeater cylinders are made of red colored material and painted with equally spaced grey dots or a color similar to the color of the tape used for the coded message. The dots are placed on the cylinder in such a manner that when a digit on the dial cylinder corresponds to a punched coded digit in the lower five channels of the tape, the grey dot on the repeater cylinder will appear at the punched hole of the tape. If the dots are made larger than a tape punch they will effectively blend in with the tape when in alignment or properly matched with the printed digit and code punch. Thus, if the dial cylinder reading matches that of the printed tape, a homogeneous tape field will appear along the five channel portion of the tape. If an error is made in setting the dial digits, then the red color on the repeater cylinder will show through and the punched hole located directly below the digit or digits in error will be readily seen by visual inspection. Such an error is noted in Fig. 2 at 32 where the code presents a setting for digit 8 and the dial cylinder has been set for a digit of 3.

In order to make the grey dots match with the holes of the coded tape, the dots are placed at 0°, 60°, and 120° on the left edge of the cylinder to correspond to the first column on the tape and digits 0 to 4 and at 180°, 240° and 300° along the right edge of the cylinder to correspond with the second column of the coded tape and digits 5 to 9. Such an arrangement is desired for the illustrated cylinders where the cylinder diameter is 30/32 inch which permits the repeater cylinder to advance the equivalent of three channels on the tape with a simultaneous advance of successive digits on the dial cylinder. Thus a rotation of 36° is required for the three-hole (channel) advance on the tape. The cylinder width is 5/16 inch with a spacing of 3/32 inch between the cylinders in order to match the required three column code spacing of the tape.

Figure 1:
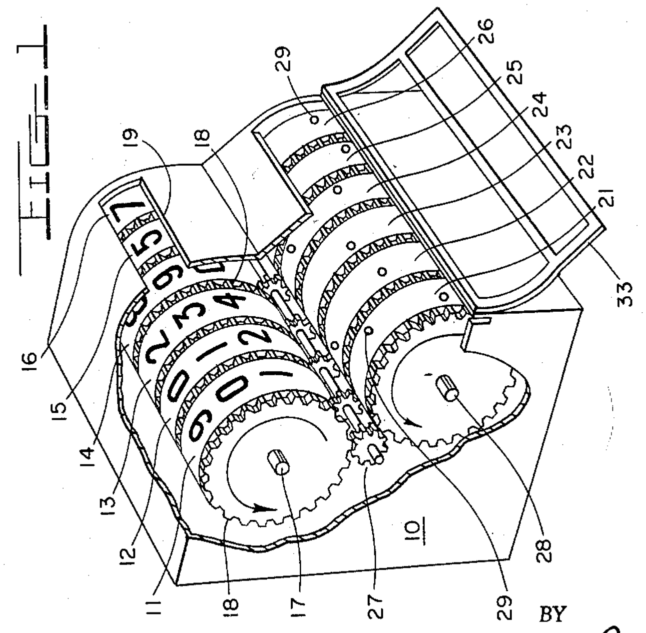
Fig. 1 illustrates a plan view of the device which has been cut away to show the relative parts.

In operation of the device the code will be printed and punched on the tape by any suitable means such as the computer compiling the data and then the tape now used as a data reference source will be positioned over the repeater cylinders within a stationary position with the tape properly indexed. (For the purpose of holding the tape in place, a guide or cover plate 33 having openings or windows therein for observation of the digits and the lower-channels is used, as shown in Figs. 1 and 2.) Then the operator sets up the digits on the dial cylinders according to the printed digits on the tape. If the digits on the dial are set correctly, a homogeneous tape field will appear along its lower portion. If the digits on the dial cylinder are not set correctly, then a red spot will appear below the incorrect digit and behind the punched hole as above stated and shown at 32 of Fig. 2. If no error is indicated by a red color display, then the operator can send the signal and feel assured that no error has been made.

The device is not limited to six dials as indicated and can be made with any desired number. For instance, a group of the above described devices could be placed side by side to present simultaneously a combination of input settings and indexing of the tape can be done mechanically by using a footage counter driven by the sprocket holes present in standard type tapes.

Obviously many modifications and variations of the present invention are possible in the light of the above teachings. It is therefore to be understood that within the scope of the appended claims the invention may be practiced otherwise than as specifically described.

What is claimed is:

1. A device for indicating errors in the transfer of printed and punch coded data which comprises a plurality of equally spaced dial cylinders having digits from zero through nine about the outer surface thereof for setting up the data to be transferred, a plurality of corresponding similar equally spaced repeater cylinders in visual proximity of said dial cylinders and operable by the rotation thereof, each of said repeater cylinders having a solid color different from the color of the punch coded data about the outer surface thereof with periodically spaced dots of the same color as said punch coded data, said repeater cylinders adapted to indicate a mismatch between the setting of the digits on said dial cylinder and the punch coded data to be transferred by said dial cylinders.

2. A device for indicating errors in the transfer of printed and punch coded data on a tape which comprises a plurality of equally spaced dial cylinders having digits from zero through nine equally spaced about the outer surface thereof for setting up data to be transferred, a plurality of corresponding similar equally spaced repeater cylinders in visual proximity of said dial cylinders and operable by the rotation thereof, each of said repeater cylinders having a solid color different from the color of the punch coded data about the outer surface thereof with equally spaced dots of the same color as said punch coded data, said repeater cylinders adapted to indicate a mismatch between the code setting of the digits on said dial cylinder and the punch coded data, said punch coded tape being adapted to be placed over a portion of said repeater cylinders and held in position by a guide means whereby a showing of said solid color through the punched code portion of the data will indicate an error in the setting of said digits on said dial cylinders.

References Cited in the file of this patent

UNITED STATES PATENTS

| | | |
|---|---|---|
| 2,043,308 | Simpson | June 9, 1936 |
| 2,102,577 | Cleven | Dec. 14, 1937 |
| 2,581,961 | Lake | Jan. 8, 1952 |
| 2,645,122 | Piatt | July 14, 1953 |